United States Patent
Kochheiser et al.

(10) Patent No.: US 8,931,163 B2
(45) Date of Patent: *Jan. 13, 2015

(54) METHOD OF INSTALLING A FASTENER TO SECURE A METAL PANEL TO A WOOD STRUCTURE

(71) Applicant: Atlas Bolt & Screw Company LLC, Ashland, OH (US)

(72) Inventors: Michael A. Kochheiser, Bellville, OH (US); Jeff Bent, Milton, CA (US)

(73) Assignee: Atlas Bolt & Screw Company LLC, Ashland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/098,136

(22) Filed: Dec. 5, 2013

(65) Prior Publication Data

US 2014/0090233 A1   Apr. 3, 2014

Related U.S. Application Data

(62) Division of application No. 13/036,465, filed on Feb. 28, 2011, now abandoned.

(60) Provisional application No. 61/309,665, filed on Mar. 2, 2010.

(51) Int. Cl.
*B23P 11/00* (2006.01)
*F16B 25/10* (2006.01)
(Continued)

(52) U.S. Cl.
CPC ........... *F16B 25/106* (2013.01); *F16B 25/0057* (2013.01); *F16B 25/0084* (2013.01); *B23P 11/00* (2013.01); *F16B 35/04* (2013.01)
USPC .................. 29/525.11; 411/387.3; 411/387.4; 411/413

(58) Field of Classification Search
CPC ............. F16B 25/0031; F16B 25/0068; F16B 25/0073; F16B 25/0042; F16B 25/0052; F16B 25/0057
USPC ............ 29/525.11; 411/412, 413, 386, 387.1, 411/387.2, 387.3, 387.4

See application file for complete search history.

(56) References Cited

U.S. PATENT DOCUMENTS 2,380,724 A    7/1945  Crooks
3,861,269 A  *  1/1975  Laverty ......................... 411/413
(Continued)

FOREIGN PATENT DOCUMENTS

CN    86207346 U    11/1967
CN    2457395 Y     10/2001
DE    20014147 US   12/2000

OTHER PUBLICATIONS

File History of U.S. Application No. 13/409,645 on Sep. 24, 2014.
(Continued)

*Primary Examiner* — Jermie Cozart
(74) *Attorney, Agent, or Firm* — Jennifer E. Lacroix; DLA Piper LLP (US)

(57) ABSTRACT

Fasteners are provided that include a head and having a head, a tip end having a tip, a first body portion having right-hand threads, and a second body portion having left-hand threads. The first body portion is adjacent to the tip end of the fastener and extends a first distance along a length of the fastener towards the head end. The second body portion is adjacent to the first body portion, and extends the head end of the fastener and extending a second distance along the length of the fastener towards the head end. The right-hand threads, and the left-hand threads, can have a thread angle α of less than about 60°.

3 Claims, 2 Drawing Sheets

(51) Int. Cl.
*F16B 25/00* (2006.01)
*F16B 35/04* (2006.01)

(56) References Cited

U.S. PATENT DOCUMENTS

| | | | |
|---|---|---|---|
| 4,621,963 A | 11/1986 | Reinwall | |
| 4,653,244 A | 3/1987 | Farrell | |
| 4,781,503 A * | 11/1988 | Bogel | 411/368 |
| 5,110,245 A | 5/1992 | Hiroyuki | |
| 5,304,024 A | 4/1994 | Schuster | |
| 6,109,850 A | 8/2000 | Commins | |
| 6,450,748 B1 | 9/2002 | Hsu | |
| 6,616,391 B1 | 9/2003 | Druschel | |
| 6,854,942 B1 * | 2/2005 | Hargis | 411/369 |
| 6,926,484 B2 * | 8/2005 | Kram et al. | 411/311 |
| 7,037,059 B2 | 5/2006 | Dicke | |
| 7,402,016 B2 | 7/2008 | Yin-Feng | |
| 7,695,228 B2 * | 4/2010 | Craven | 411/413 |
| 7,832,173 B2 | 11/2010 | Crawford et al. | |
| 8,348,571 B2 | 1/2013 | Shih | |
| 2002/0094255 A1 | 7/2002 | Neuhengen | |
| 2004/0151559 A1 * | 8/2004 | Craven | 411/413 |
| 2005/0265806 A1 * | 12/2005 | Craven | 411/386 |
| 2006/0140741 A1 | 6/2006 | Lin | |
| 2007/0217887 A1 * | 9/2007 | Lin | 411/413 |
| 2009/0010734 A1 * | 1/2009 | Lin | 411/413 |
| 2009/0104001 A1 * | 4/2009 | Kochheiser | 411/383 |
| 2009/0245973 A1 * | 10/2009 | Pieciak et al. | 411/413 |
| 2010/0196122 A1 * | 8/2010 | Craven | 411/413 |

OTHER PUBLICATIONS

Related U.S. Appl. No. 13/409,645 electronically captured on Oct. 28, 2014 between Sep. 24, 2014 and Oct. 15, 2014.

* cited by examiner

US 8,931,163 B2

METHOD OF INSTALLING A FASTENER TO SECURE A METAL PANEL TO A WOOD STRUCTURE

CROSS-REFERENCE TO RELATED APPLICATIONS

This application is a divisional of U.S. patent application Ser. No. 13/036,465, filed Feb. 28, 2011, currently pending, which claims the benefit of U.S. Provisional Application Serial No. 61/309,665, filed Mar. 2, 2010, the disclosures of which are hereby incorporated by reference in their entirety.

FIELD OF THE INVENTION

The present technology relates to fasteners and methods of installing fasteners, and particularly fasteners that can be used to secure metal panels to wood building structures.

BACKGROUND

In the construction industry, post frame metal building materials are attached to the wooden frame structure with various types of wood fasteners. However, current wood fastener thread designs have a tendency to back-out over time, thus weakening the connection and the building's structural integrity. Additionally, known fasteners can have a tendency to break during installation due to high drive torques in certain high density materials, as well as having a tendency to strip-out in certain low density materials.

SUMMARY OF THE INVENTION

The present technology relates to fasteners and methods of installing fasteners in order to secure metal panels to wood building structures.

In one aspect, a fastener is provided that includes a head and having a head, a tip end having a tip, a first body portion, and a second body portion. The first body portion is adjacent to the tip end of the fastener and extends a first distance along a length of the fastener towards the head end. The first body portion includes right-hand threads having a thread angle a of less than about 60°. The second body portion is adjacent to first body portion and extends a second distance along the length of the fastener towards the head end. The second body portion includes left-hand threads.

In a second aspect, a fastener is provided that includes a head and having a head, a tip end having a tip, a first body portion, and a second body portion. The first body portion is adjacent to the tip end of the fastener and extends a first distance along a length of the fastener towards the head end. The first body portion includes right-hand threads having a thread angle a from about 20° to about 40°. The second body portion is adjacent to first body portion and extends a second distance along the length of the fastener towards the head end. The second body portion includes left-hand threads having a thread angle a from about 20° to about 40°.

In a third aspect, a method of installing a fastener to secure a metal panel to a wood structural element is provided that includes the steps of creating a bur of metal as a tip of the fastener penetrates the metal panel; causing an area of the metal panel immediately surrounding the fastener to pull away from the wood structural element as right-hand threads on a first body portion of the fastener pass through the metal panel; contacting the bur of metal with left-hand threads on a second body portion of the fastener; removing the bur of metal as the left-hand threads pass through the metal panel; pushing the area of the metal panel towards the wood structural element; and contacting the wood structural element with the area of the metal panel prior to the area of the metal panel being contacted with the head of the fastener.

BRIEF DESCRIPTION OF THE DRAWINGS

Specific examples have been chosen for purposes of illustration and description, and are shown in the accompanying drawings, forming a part of the specification.

DETAILED DESCRIPTION

Fasteners of the present technology can be used in any suitable application, but are most particularly suited to construction applications in which metal building materials are secured to wood frame structures.

Figure 1:
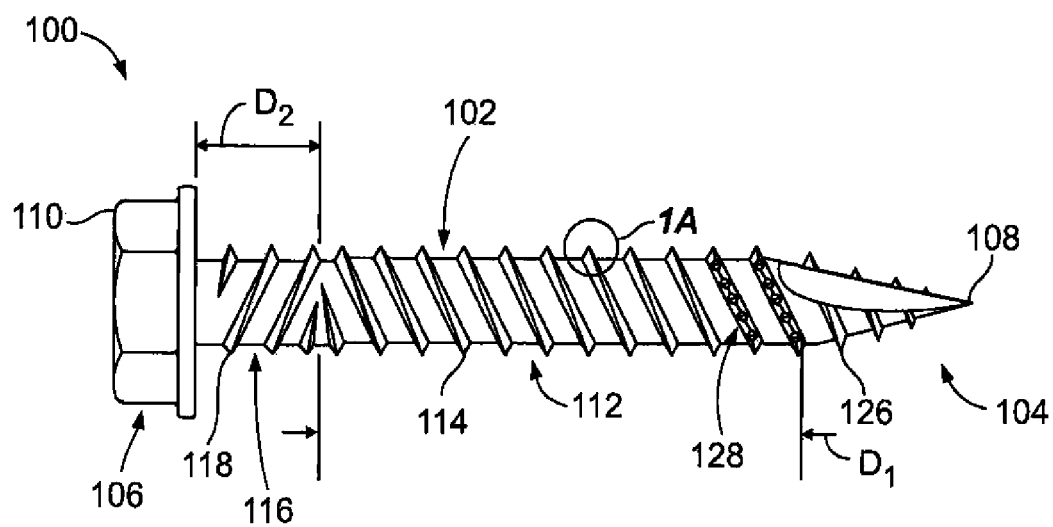
FIG. 1 is a side elevational view of one example of a fastener of the present technology.
Figure 1A:
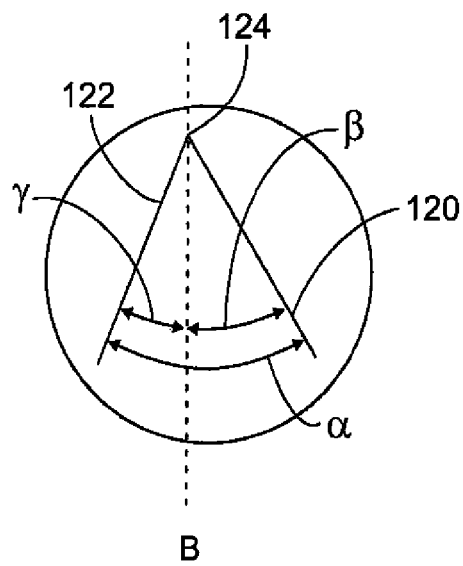
FIG. 1A is a detail view of the area A of FIG. 1.
Figure 2:
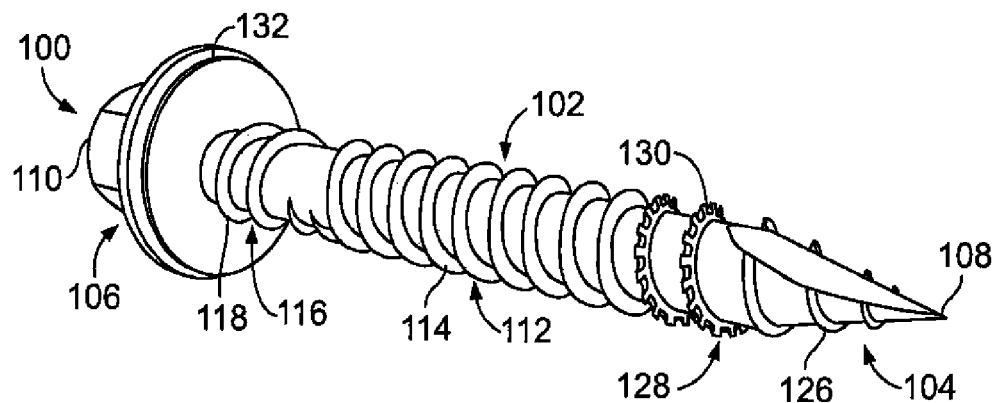
FIG. 2 is a perspective view of a second example of a fastener of the present technology, having a sealing washer assembled therewith.
Figure 3:
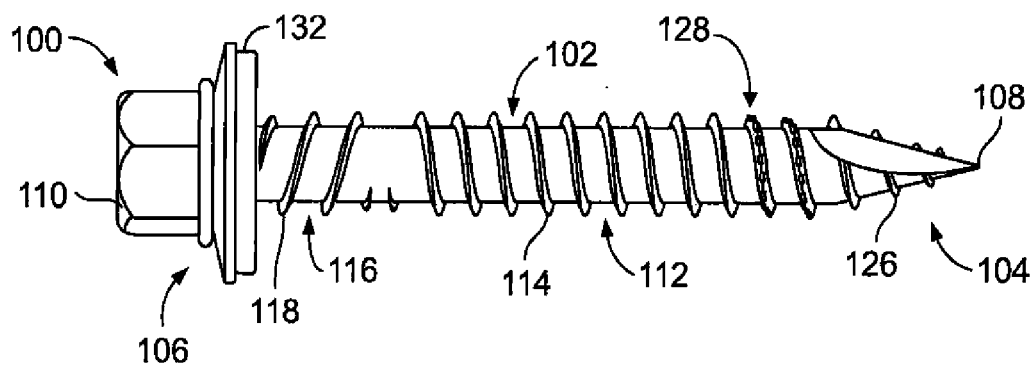
FIG. 3 is a side elevational view of the fastener of FIG. 2, having a sealing washer assembled therewith.

FIGS. 1, 1A and 2 illustrate examples of a fastener 100 of the present technology. The same reference numbers have been used for aspects that are the same in each of the illustrated examples. The fastener 100 can be made of any suitable material, including for example carbon steel. Additionally, the fastener 100 can have a coating, such as a coating to improve the weather resistance properties of the fastener 100. A fastener 100 can have any suitable length, including but not limited to 1 inch, 1.5 inches, 2 inches, 2.5 inches, or 3 inches.

As illustrated in FIGS. 1 and 2, the fastener 100 has a body 102 that includes a tip end 104 and a head end 106. The fastener 100 has a point 108 at the tip end 104 of the body, and a head 110 at the head end 106 of the body. The fastener 100 also has a first body portion 112 that is adjacent to the tip end 104 and includes right-hand threads 114, and a second body portion 116 that is adjacent to the head end 106 and includes left-hand threads 118. The head of the fastener 100 can be any suitable style. The tip end 104 of the fastener 100 can include one or more partially formed threads 126. The point 108 of the fastener 100 can include a sharp, self-tapping point. In the illustrated example, the fastener 100 has a type-17 point, which can allow for desired penetration in lapped metal conditions. As illustrated in FIG. 2, a sealing washer 132 can be included with, or assembled to a fastener 100. The sealing washer 132 can be any suitable material, such as rubber, and may be placed on the fastener 100 adjacent to and abutting the head 106.

The first body portion of the fastener 100 is adjacent to the tip end 104 of the fastener 100 and extends a first distance $D_1$ along the length of the fastener 100 towards the head end 106. The first body portion 112 includes right-hand threads 114. The right-hand threads 114 can be single or multi-lead threads. The right-hand threads 114 can have any suitable diameter and number of threads per inch of length along the body of the fastener. For example, the right-hand threads 114 of the illustrated embodiment are 10-14 threads, having a #10 diameter, which is a major diameter of about 0.19 inches plus or minus normal ANSI tolerances, and about 14 threads per inch. As illustrated in the detail call-out of FIG. 1A, the right-hand threads 114 have a thread angle a that less than standard threads having a 60° thread angle. For example, the right-hand threads 114 of the fastener 100 can have a thread angle α that is from 20° to about 40°.

The thread angle α of the right-hand threads 114 can have a 0° to 10°/20° to 30° geometric configuration. In such an example, each thread has a lead flank angle β on the tip side 120 of the thread, which faces towards the tip 108 of the fastener 100, and a trailing flank angle γ on the head side 122 of the thread, which faces the head end 110 of the fastener 100. For example, the tip side 120 and the head side 122 of each thread slope towards each other from the base of the thread and meet at a point 124 that is a certain height from the body 102 of the fastener 100. When a vertical reference line B is drawn to the body of the fastener from the point 124, the tip side 120 of the thread slopes away from the vertical reference line at the lead flank angle β, which can be from about 20° to about 30°. In such an example, the head side 122 of the thread slopes away from the vertical reference line at the trailing flank angle γ, which can be from about 0° to about 10°. For example, the thread thread angle a can be about 30°, with the lead flank angle β of the tip side 120 being about 20°, and the trailing flank angle γ of the head side 122 being about 10°. In at least some examples, the geometric configuration of the threads can improve the fastener's resistance to backing out over time after installation.

In some examples, one or more of the first fully formed right-hand threads 114 on the first body portion 112, which are the threads closest to the tip end 104 of the fastener, can include serrations 128. In at least one example, at least one of the first three fully formed right-hand threads 114 on the first body portion 112, which are the threads closest to the tip end 104 of the fastener, can include serrations 128. For example, one, two, or all three of the first fully formed right-hand threads can include serrations 128. In the examples illustrated in FIGS. 1 and 2, the first two fully formed threads include serrations 128. In the example illustrated in FIG. 2, the serrations 128 can be teeth 130. Such teeth can be rectangular, as illustrated in FIG. 2, or can have any other suitable shape, such as being triangular. In at least some examples, serrations 128 can reduce the drive torque needed to install the faster 100, and facilitate installation of the fastener 100 through knots and hardwood. Additionally, it is common that when a fastener pierces metal siding, a bur of metal can be created, which is sometimes called a pig-tail. The inclusion of serrations 128 can result in the bur being removed then the serrated threads contact the bur as the fastener 100 is being installed.

The second body portion 116 of the fastener 100 is adjacent to the first body portion 112 of the fastener 100 and extends a second distance $D_2$ along the length of the fastener 100 towards the head end 106. In preferred examples, the length of the second body portion can be less than the length of the first body portion. For example, with reference FIG. 1, the second distance $D_2$ of the second body portion 116 can be less than the first distance $D_1$ of the first body portion. In some examples, such as when the total length of the fastener 100 is about 3 inches or less, the length of the second body portion, which is equal to the second distance $D_2$ of the second body portion, can be less than or equal to about one quarter of an inch (0.6 cm).

The second body portion 116 includes left-hand threads 118. The left-hand threads 118 can be single or multi-lead threads. The left-hand threads 116 can have any suitable diameter and number of threads per inch of length along the body of the fastener. The second body portion 116 of the fastener 100 can include any number of left-hand threads, including, for example, from about 1 thread to about 5 threads, or preferably from about 2 threads to about 4 threads. The left-handed threads have the same diameter as the right-hand threads, or can be oversized, meaning that the left-hand threads can have a larger diameter than the right-hand threads. As illustrated in FIGS. 1 and 2, the left-hand threads the left-hand threads 116 of the illustrated embodiment can be 10-12 threads, having a #10 diameter, which is a major diameter of about 0.19 inches plus or minus normal ANSI tolerances, and about 12 threads per inch. In at least some examples when a fastener is being installed through metal siding, the left-hand threads can result in the bur being removed that is commonly created when the fastener pierces the metal siding. Additionally, the left-hand threads can invert the edge of the metal around the insertion hole of the fastener 100, which can create a smooth surface and may prevent the metal siding from cutting and damaging the rubber sealing washer 132. Further, while right-hand threads tend to back-out over time due to expansion and contraction of the building materials and the fastener when subjected to varying weather conditions, the left hand threads can tend to apply force in opposite direction, resisting back-out.

In at least some examples, the left-hand threads 118 can have the same thread angle as the right-hand threads. Accordingly, the left-hand threads 118 have a thread angle a that less than standard threads having a 60° thread angle. For example, the left-hand threads 118 of the fastener 100 can have a thread angle α that is from about 20° to about 40°. As discussed above with reference to FIG. 1A, the thread angle α of the left-hand threads 118 can have a 0° to 10°/20° to 30° geometric configuration. In such an example, each thread has a lead flank angle β on the tip side 120 of the thread, which faces towards the tip 108 of the fastener 100, that can be from about 20° to about 30°. Each thread also has a trailing flank angle γ on the head side 122 of the thread, which faces the head end 110 of the fastener 100, that can be from about 0° to about 10°. For example, the thread thread angle α can be about 30°, with the lead flank angle β of the tip side 120 being about 20°, and the trailing flank angle γ of the head side 122 being about 10°.

In at least one application, fasteners of the present technology can be used to secure metal panels to wood building structures. One method of installing a fastener 100 of the present technology can include steps of inserting the fastener through a metal panel and into a wood structural element. A sealing washer 132 can be assembled to the fastener 100 prior to inserting the fastener 100 through the metal panel and into the wood structural element. As with conventional fasteners, the step of inserting the fastener 100 can include the fastener 100 creating a bur, or pigtail, of metal that is attached to the metal panel as the tip 108 of the fastener penetrates the metal panel. Additionally, as also tends to be observed with conventional fasteners, the step of inserting the fastener 100 can include the right-hand threads of the fastener causing an area of the metal panel immediately surrounding the fastener 100 to pull away from the wood structural element, as the right-hand threads 114 of the first body portion 102 of the fastener 100 pass through the metal panel. In methods of installing conventional fasteners, creating a bur of metal and causing the area of the metal panel immediately surrounding the fastener to pull away from the wood structural element can each tend to cause damage to the sealing washer.

However, in methods of installing fasteners of the present technology, such damage to the washer may be reduced or prevented. For example, the step of inserting a fastener 100 can also include the fastener 100 removing the bur of metal as it passes through the metal panel. In one example, removing the bur of metal can include contacting the bur of metal with the left-hand threads 118 on the second body portion of the fastener, and one or more of the left-hand threads detaching the bur of metal as the left-hand threads 118 pass through the metal panel. In another example, where the fastener includes one or more right-hand threads having serrations 128, removing the bur of metal can include contacting the bur of metal with the serrations 128 on the one or more right-hand threads 114, and one or more of the serrations 128 detaching the bur of metal as the one or more right-hand threads 114 having serrations 128 pass through the metal panel.

Additionally, in practice, the metal panel can stop pulling away from the wood structural element at the junction of the right-hand and left-hand thread. Once the left-hand threads 118 make contact with the metal panel, the left-hand threads 118 can push the metal panel toward the wood structural element prior to the fastener being fully inserted, at which point the area of the metal panel would be in contact with the head 110 of the fastener 100, or with the sealing washer 132 that can be adjacent to and abutting the head 110 of the fastener 100. Accordingly, the step of inserting a fastener 100 can also include pushing the area of the metal panel, which had been caused to pull away from the wood structural element, towards the wood structural element, and contacting the wood structural element with the area of the metal panel prior to the area of the metal panel being contacted with the head of the fastener or the sealing washer adjacent to the head of the fastener. This may enable the fastener installer to know that the metal panel has made contact with the wood structural element prior to the fastener being completely installed. In such instances, the fastener installer can then apply an appropriate final seating torque to the fastener, thus properly compressing the sealing washer, and preventing the fastener and sealing washer from being over-torqued, which may damage the sealing washer and result in leaks.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of installing a fastener to secure a metal panel to a wood structural element is provided that comprises the steps of:
    creating a bur of metal as a tip of the fastener penetrates the metal panel;
    causing an area of the metal panel immediately surrounding the fastener to pull away from the wood structural element as right-hand threads on a first body portion of the fastener pass through the metal panel;
    removing the bur of metal as the fastener passes through the metal panel;
    pushing the area of the metal panel towards the wood structural element as left-hand threads on a second body portion of the fastener pass through the metal panel; and
    contacting the wood structural element with the area of the metal panel prior to the area of the metal panel being contacted with a head of the fastener or a sealing washer adjacent to the head of the fastener.

2. The method of claim 1, wherein the step of removing the bur of metal comprises:
    contacting the bur of metal with the left-hand threads on the second body portion of the fastener; and
    detaching the bur of metal as the left-hand threads pass through the metal panel.

3. The method of claim 1, wherein the step of removing the bur of metal comprises:
    contacting the bur of metal with one or more right-hand threads having serrations; and
    detaching the bur of metal as the one or more right-hand threads having serrations pass through the metal panel.

* * * * *